Patented Sept. 13, 1949

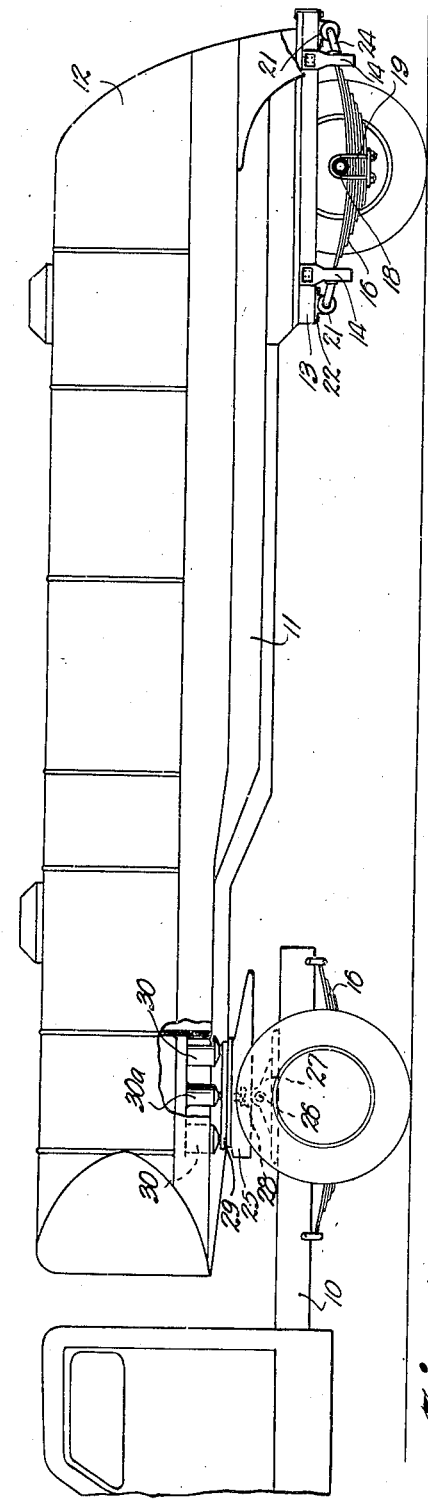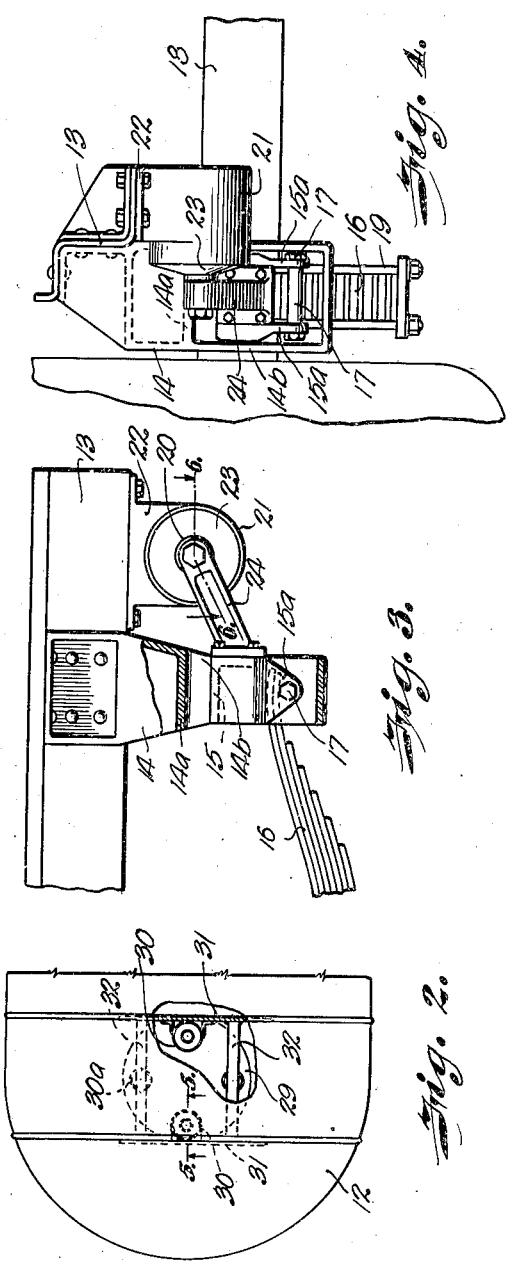

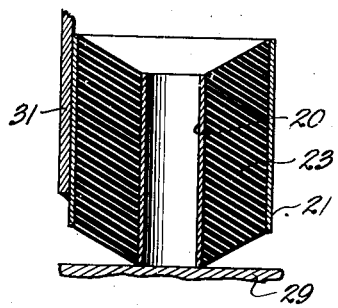
Fig. 5.
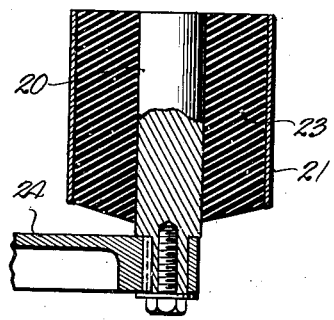
Fig. 6.
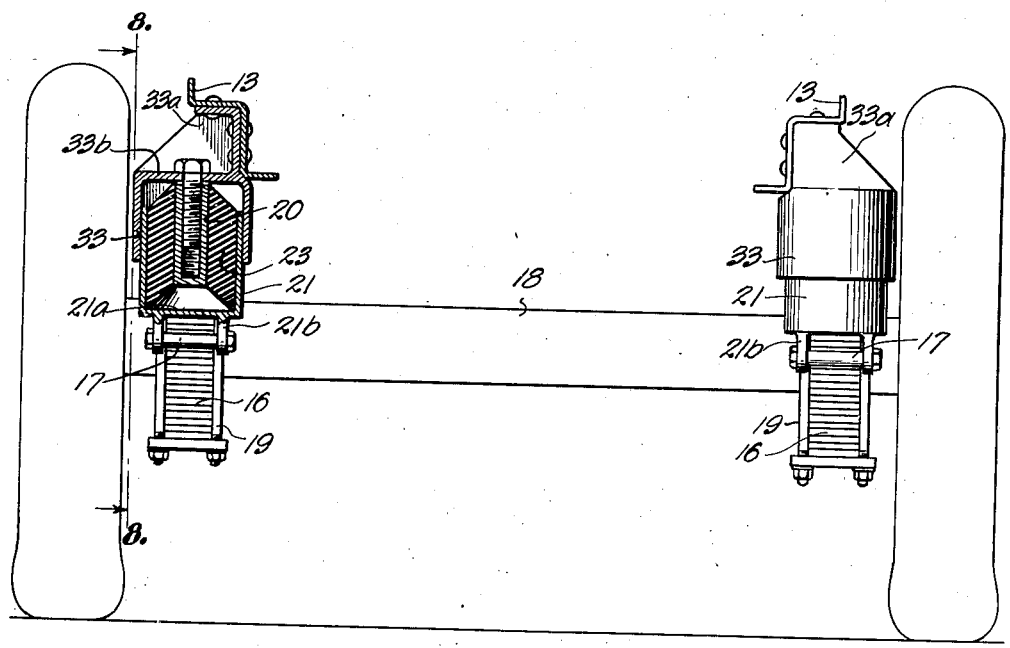
Fig. 7.
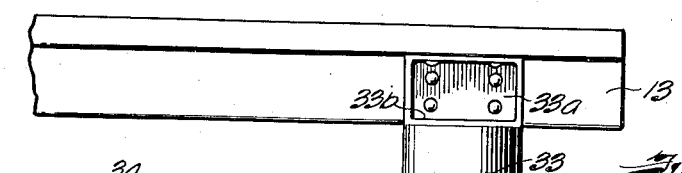
Fig. 8.
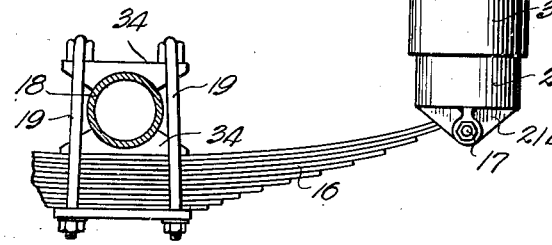
INVENTORS.
Leon H. Bradley
James T. Jennings, Jr.
BY
ATTORNEY.

2,481,817

UNITED STATES PATENT OFFICE 2,481,817

AUXILIARY SUSPENSION ASSEMBLY FOR VEHICLES

Leon H. Bradley, Independence, and James T. Jennings, Jr., Kansas City, Mo., assignors to Butler Manufacturing Company, Kansas City, Mo., a corporation of Missouri Application September 28, 1944, Serial No. 556,157

3 Claims. (Cl. 267—15)

Our invention relates broadly to suspension assemblies or resilient mountings for motor vehicles.

Springs having sufficient capacity to carry heavy loads are provided on trucks or tractor-trailer combinations. When the vehicle is empty the spring suspension has little or no resilient effect. Many States have enacted laws limiting the legal laden weight. These laws have prompted manufacturers to construct lighter commercial vehicles, thus increasing the permissible pay load. Vibrations resulting from unsprung weight during empty hauls have proven to be very destructive to equipment.

This problem has been particularly troublesome in vehicles having tanks mounted thereon. Vibration causes crystallization of the metal resulting in leaks and other body failures. This constitutes a definite fire hazard in the transportation of petroleum products.

We have accomplished an improvement in the conventional spring assemblies by the use of auxiliary resilient flexible mountings. The arrangement is simple in its construction and provides the vehicle when empty with resilient suspension. The auxiliary mountings are seated when the load is added and the resilient suspension is then provided by the main springs.

The assembly is an improvement over the construction shown in Patent 2,245,382 dated June 10, 1941.

One object of our invention is to provide vehicle spring assembly in which the vehicle body, when in an unloaded condition, rides on comparatively flexible resilient mountings which reduce destructive vibration.

Another object of our invention is to provide flexible resilient mountings, which seat when the vehicle is in a loaded condition.

A further object of our invention is to provide spring mountings of a more rugged construction than the auxiliary leaf spring mountings.

Other and further objects of our invention will appear from the following description.

In the accompanying drawings which form part of the instant specification and which are to be read in conjunction therewith, and in which like reference numerals are to be used to indicate like parts in the various views, Fig. 1 is a side view of a tractor-trailer assembly showing a preferred embodiment of our invention, Fig. 2 is a fragmentary top plan view of the front portion of the trailer showing the fifth wheel arrangement, Fig. 3 is an enlarged detail view showing the torsion type auxiliary mounting in combination with a rear wheel spring assembly, Fig. 4 is an enlarged detail end view of the rear wheel suspension assembly shown in Fig. 3, Fig. 5 is a view taken along the line 5—5 in Fig. 2 in the direction of the arrows, Fig. 6 is a view taken along the lines 6—6 in Fig. 3 in the direction of the arrows, Fig. 7 is a rear view showing the auxiliary shear type mountings on the rear springs of a vehicle, Fig. 8 is a side view of one of the shear type mountings shown in Fig. 7.

Referring to the drawings, numeral 10 designates the frame of a tractor attached to a trailer whose frame 11 supports twin tanks 12 as shown in Patent 2,192,593 dated March 5, 1940. The rear end of the frame is mounted on sill members 13.

The rear wheel spring suspension assembly has guide brackets 14 riveted or otherwise fastened to sills 13. Each guide bracket assembly has a seating plate 14a which forms the top of a housing 14b surrounding a connecting block 15. Connecting block 15 has depending wings 15a which straddle the end of spring 16 slidably supported on bolt 17. The springs 16 are attached to axle 18 by means of U-bolts 19. The springs 16 are of the conventional type made up of a plurality of leaves of varying lengths.

The torsion element detailed in Fig. 6 consists of an inner cylinder 20 and an outer cylinder 21. The outer cylinder 21 has a flanged bracket 22 bolted to the sill 13. The annular space between cylinders 20 and 21 is filled with a tough resilient web of flexible material 23 which is rigidly bonded to the surfaces of the respective cylinders. Rubber or synthetic rubber has proved satisfactory as the resilient material for the web.

Inner cylinder 20 extends beyond cylinder 21 at one end and to this extended end is adjustably attached torque arm 24. The opposite end of the torque arm 24 is affixed to connecting block 15.

The front end of trailer 11 is carried by tractor 10 upon a conventional fifth wheel shown in Figs. 1 and 2. The fifth wheel assembly has a lower friction plate 25 pivoted upon a cross shaft 26 which is carried by bolsters 27. Bolsters 27 are mounted upon the frame 10 of the tractor.

A king pin 28 mounted on an upper friction plate 29 fits into a slot formed in the lower friction plate 25. This fifth wheel assembly is of the semi-automatic type conventional with this type of vehicle. Spring suspension for the front or fifth wheel end of the twin tank consists of the tractor leaf springs 16 similar in construction to the rear trailer springs and resilient auxiliary mountings of the shear type designated by numerals 30 and 30a in Figs. 1 and 2. The shear type elements 30 and 30a are identical in construction except for size and are detailed in Fig. 5. Since the greater weight of the empty tanks is carried along the axis of the vehicle the auxiliary elements 30 are somewhat larger than the lateral elements 30a. Elements 30 and 30a are similar in construction to the torsion elements having an inner cylinder 20, and outer cylinder 21, and an annular web of flexible bonding material 23. The functioning of the elements is however different in that the flexible material of the torsional element is put in stress by rotation of the inner cylinder while the shear type element is put in stress by movement axially of the inner cylinder with respect to the outer cylinder or shell. These elements are of similar construction to the "Vibro-Insulators" manufactured by the B. F. Goodrich Company.

Upper friction plate 29 is fixedly mounted on the lower ends of the inner cylinders 20 of each of auxiliary resilient mountings or shear type elements. The outer cylinders 21 of elements 30 are fixedly attached to cross bolsters 31 extending transversely of the vehicle. The outer cylinders of elements 30a are attached to longitudinal braces 32 positioned between bolsters 31. In the single tank or twin tank vehicles to lower the center of gravity, it may be advisable to inset the elements in cavities or pockets formed in the bottom of the tanks.

A modified form or embodiment of our invention as applied to the rear trailer spring assembly is shown in Figs. 7 and 8 where the auxiliary resilient elements are of the shear type instead of the torsional type. The resilient elements are here positioned vertically in contrast with the horizontal positioning of the torsional type. In this modification the inner cylinder 20 of the shear element is bolted into the top of an open ended cylindrical housing 33 the walls of which surround and enclose the upper portion of the outer cylinder 21. These housings 33 are hung from the sills 13 of the vehicle by brackets 33a. The outer cylindrical shell of this shear type element is cup shaped. The bottom 21a equipped with ears 21b by means of which the cylindrical cup is attached to the spring end by supporting bolt 17. When empty the weight of the tanks and frame is supported or carried by the flexible material 23 bonded to the cylinders and put in shear by relative movement of the concentric cylinders. When loaded the cylinders seating against the top 33b of the housing 33 and against the bottom 21a of the outer cylinder form a rigid connection to transfer the weight of the loaded tanks directly from the sill 13 to the main spring 16. The spring assembly 16 in this modification is clamped to axle 18 by U-bolts 19 carried by the axle on saddles 34.

The arrangement of the main spring 19 and the auxiliary resilient mountings is adapted to supply a supplemental buoyant or resilient spring suspension of the trailer body when the vehicle is operating in an unloaded and a loaded condition. The auxiliary mountings are much more easily flexed than the main springs and supply the resilient suspension for the unloaded tank. An increase of the load imposes increased stress upon the resilient mountings until the mountings become seated. When seated a rigid connection is formed between the vehicle frame and main springs.

The auxiliary suspension of the torsion type is more adapted to provide resilient suspension through a torque action given the flexible bonding material and this is accomplished in the following manner. The weight of the empty vehicle load is transferred from sill 13 to cylinder 21. Cylinder 20 receives the load through the web of resilient flexible material 23 and irregularities in the road surface are absorbed or neutralized in torque or rotative twist given to the flexible material. In other words torque arm 24 receives the load from cylinder 20 and transfers the load to connecting block 17 and through the springs to the wheels. As the load is increased the torsional twist exerted upon the resilient material 23 becomes greater, lowering sill 13 until plate 14a is seated upon connecting block 15. At this time the weight of the loaded trailer is transferred directly through a connection between guide bracket 14, plate 14a and connecting block 15 to spring 16.

The main springs 16 have their optimum resiliency when the vehicle is loaded. The auxiliary resilient mountings have their optimum resiliency and function only when the vehicle is empty.

The auxiliary shear type mountings on the fifth wheel assemblly operate the same as the shear type elements on the rear trailer springs shown in Figs. 7 and 8.

Tractor 10 is equipped with conventional springs 16 adapted to have optimum resiliency when carrying a loaded trailer. Obviously such springs are possessed with little or no resiliency when the trailer is empty.

The load of the front of the trailer is transferred from the cross bolsters 31 and braces 32 through the shear type mountings to the upper friction plate 29. The elements are partially flexed from their normal positions when suspending the weight of the empty trailer. An increase of the load forces the outer cylinders downward until they seat against plate 29. Simultaneously the inner cylinders 20 seat against the upper enclosing plates. Thus the seated mountings provide a rigid connection between the front of the trailer and fifth wheel assembly.

It will be seen that we have accomplished the object of our invention. We have provided a novel spring assembly for motor vehicles in which we are able to reduce vibrational stresses upon a vehicle operating either empty or loaded, thus reducing to a minimum the principal causes of body or frame failures.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, we claim:

1. A spring suspension for motor vehicle bodies including a body with a frame and axle construction, a spring mounted on the axle adapted to resiliently support the loaded body, an auxiliary resilient mounting coacting with said spring to resiliently support the body in unloaded condition, said auxiliary mounting comprising a bracket slidably connected to said spring, a torque arm attached to the bracket, concentric surfaces operably connected respectively to the frame and the torque arm, said surfaces bonded together with a web of flexible nonmetallic material, and a seat against which the bracket is adapted to bear when the nonmetallic material is in flexed condition due to the total load exceeding the weight of the unloaded body, said seat adapted to transfer the load to the spring through said slidable connection between the bracket and spring.

2. A spring suspension for a vehicle body having a frame and axle construction, comprising a leaf spring mounted on the axle adapted to resiliently support the loaded body, a pair of concentric cylinders bonded together with a web of flexible nonmetallic material, a rigid connection between one of said cylinders and the frame maintaining the axes of the cylinders substantially horizontal, a torque arm carried by the other cylinder and adapted to move in a vertical plane when said nonmetallic material is flexed, means providing a sliding connection between the free end of the torque arm and one end of the leaf spring permitting horizontal movement of the end of the spring relative to the end of the torque arm, the weight of the unloaded body being transmitted to the axle through said flexible material, torque arm, sliding connection and spring, and a vertical guideway on the frame at the junction of said torque arm and spring cooperating with said means to prevent movement of said sliding connection in a direction parallel to the axes of said cylinders.

3. A spring suspension as in claim 2 having a stop in said guideway limiting the upward movement of the torque arm, said stop effective to transmit the body load directly to said spring when the load exceeds a predetermined value.

LEON H. BRADLEY.
JAMES T. JENNINGS, JR.

REFERENCES CITED

The following references are of record in the file of this patent:

UNITED STATES PATENTS

| Number | Name | Date |
| --- | --- | --- |
| 1,031,612 | Anger | July 2, 1912 |
| 1,617,031 | Schacht | Feb. 8, 1927 |
| 2,027,990 | Lubbers | Jan. 14, 1936 |
| 2,125,184 | Kjolseth | July 26, 1938 |
| 2,166,822 | Parker | July 18, 1939 |
| 2,198,616 | Hickman | Apr. 30, 1940 |
| 2,242,852 | Flowers | May 20, 1941 |

FOREIGN PATENTS

| Number | Country | Date |
| --- | --- | --- |
| 511,715 | Great Britain | Aug. 23, 1939 |